US006655878B1

(12) United States Patent
de Vos et al.

(10) Patent No.: US 6,655,878 B1
(45) Date of Patent: Dec. 2, 2003

(54) DEVICE AND METHOD FOR SINGULATING FROM A HOLDER WITH LIQUID AND/OR INDIVIDUALIZING OF FRUITS

(75) Inventors: Marinus de Vos, Gouda (NL); Jan Marinus van Arkel, Tricht (NL)

(73) Assignee: De Greef's Wagen-, Carrosserie-en Machinebouw B.V., Tricht (NL)

( * ) Notice: Subject to any disclaimer, the term of this patent is extended or adjusted under 35 U.S.C. 154(b) by 0 days.

(21) Appl. No.: 09/744,290

(22) PCT Filed: Jul. 23, 1999

(86) PCT No.: PCT/NL99/00475

§ 371 (c)(1),
(2), (4) Date: Mar. 26, 2001

(87) PCT Pub. No.: WO00/05159

PCT Pub. Date: Feb. 3, 2000

(30) Foreign Application Priority Data

Jul. 23, 1998 (NL) .............................................. 1009719

(51) Int. Cl.⁷ .............................................. B65G 53/44
(52) U.S. Cl. .............................. 406/77; 406/83; 406/69; 406/198
(58) Field of Search .............................. 406/69, 77, 83, 406/86, 154, 192, 198

(56) References Cited

U.S. PATENT DOCUMENTS

| 2,831,518 | A | | 4/1958 | Buck |
| 3,610,395 | A | * | 10/1971 | Amori ........................ 198/445 |
| 4,138,340 | A | * | 2/1979 | Suzuki et al. ................ 210/396 |
| 4,194,922 | A | * | 3/1980 | Gransell et al. ................ 134/1 |
| 4,898,270 | A | | 2/1990 | Hopkins et al. |
| 4,901,861 | A | * | 2/1990 | Cicchelli ..................... 209/539 |
| 4,932,513 | A | * | 6/1990 | Michimae et al. ..... 198/397.06 |
| 5,121,635 | A | | 6/1992 | Coffelt et al. |
| 6,401,913 | B1 | * | 6/2002 | Blanc ......................... 198/779 |

FOREIGN PATENT DOCUMENTS

| EP | 0635443 | 1/1995 |
| FR | 2725704 | 4/1996 |
| GB | 1598224 | 9/1981 |

* cited by examiner

Primary Examiner—Joseph A. Dillon
(74) Attorney, Agent, or Firm—Needle & Rosenberg, P.C.

(57) ABSTRACT

The present invention provides a device and method for singulating from a holder with liquid and/or individualizing of products, such as fruits, wherein the device comprises: a discharge conveyor extending above the liquid level in the holder for discharging the products in rows; and a feed conveyor of V-shaped cross-section, the discharge end of which connects onto a front end of the discharge conveyor and which extends at an inclination from this front end to below the liquid level in the liquid holder.

12 Claims, 3 Drawing Sheets

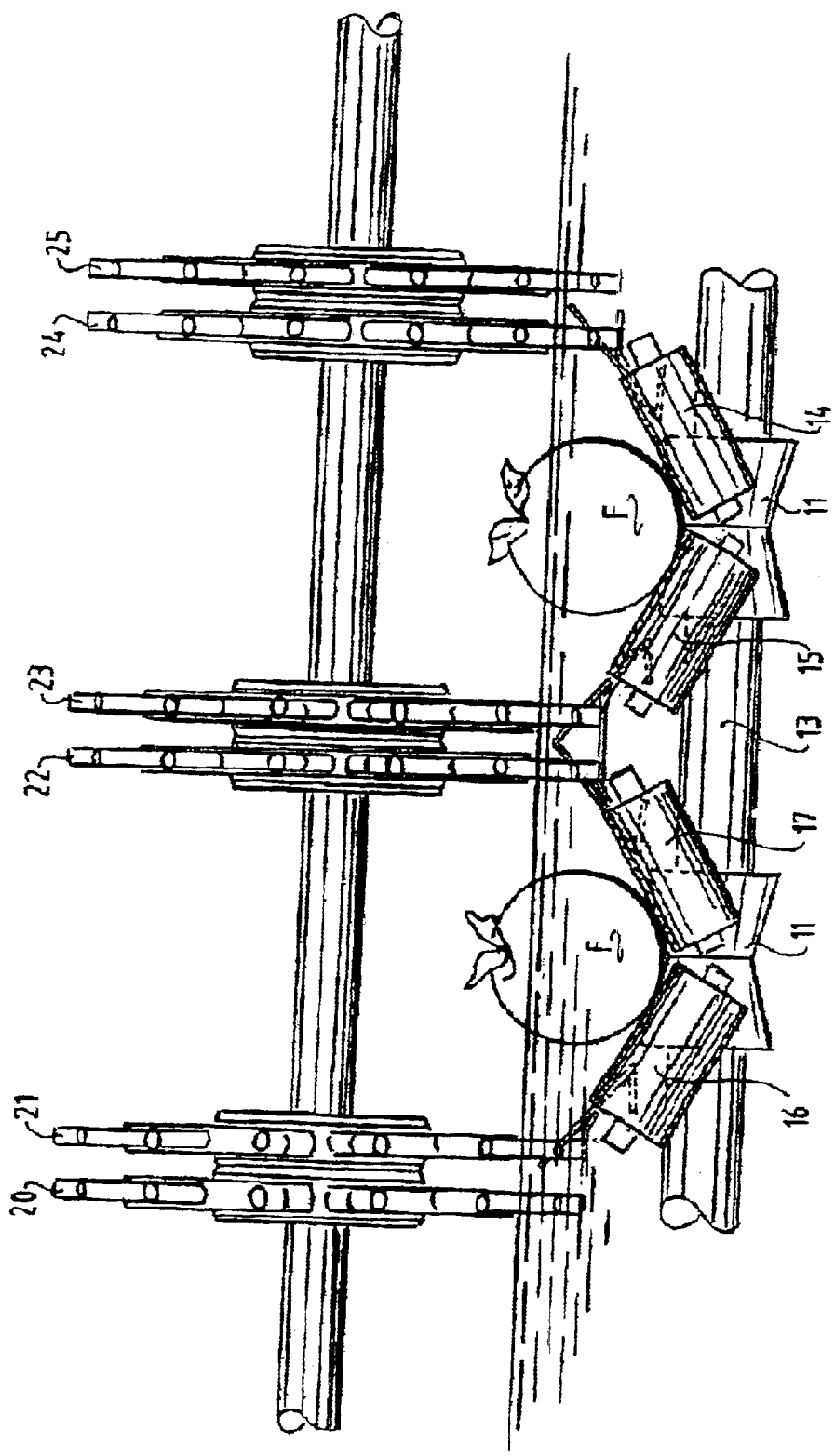

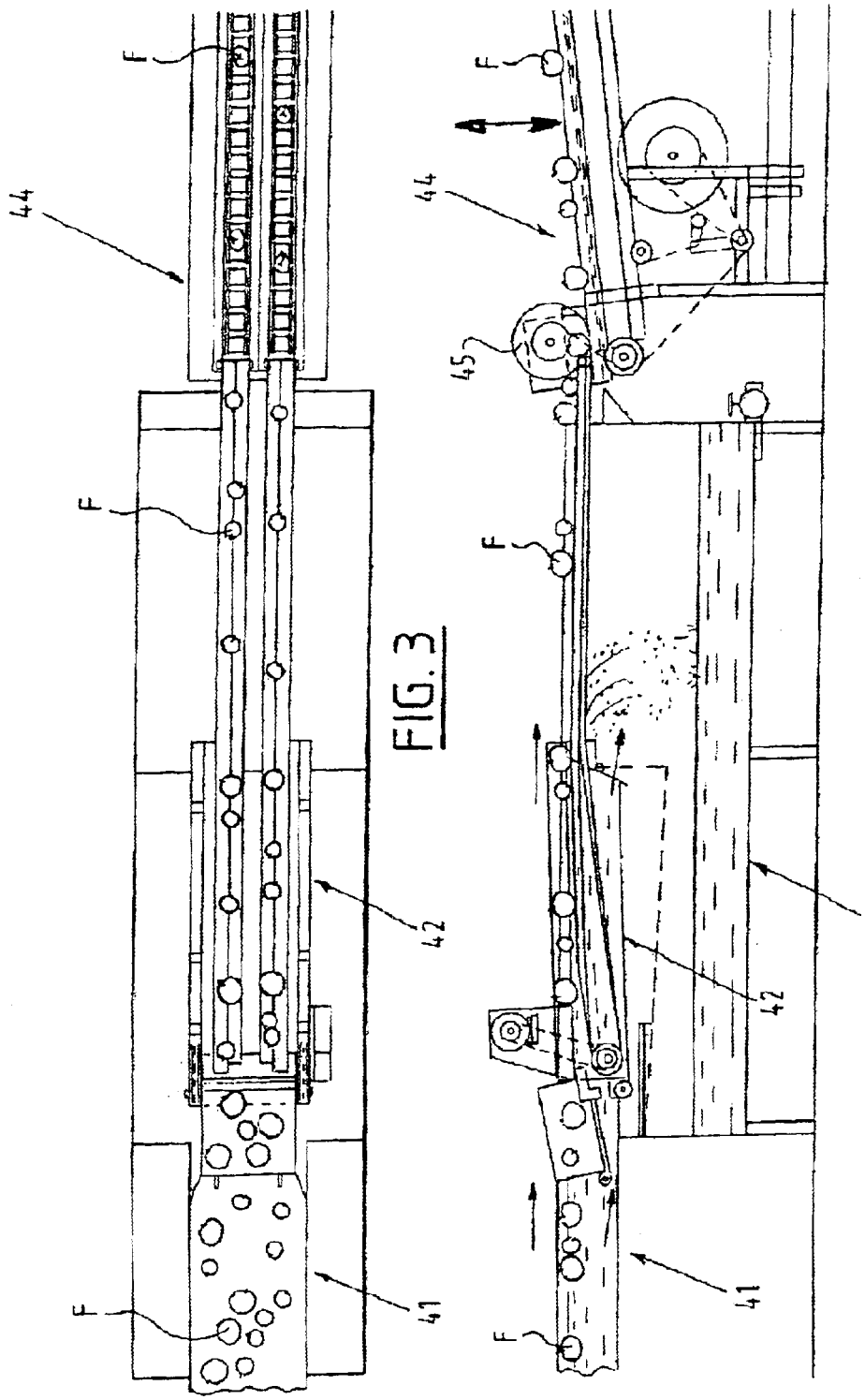

DEVICE AND METHOD FOR SINGULATING FROM A HOLDER WITH LIQUID AND/OR INDIVIDUALIZING OF FRUITS

BACKGROUND OF THE INVENTION

Vulnerable products, such as fruits, in relatively large crates are in practice usually emptied into a holder with liquid, usually water, from where the fruits must be transferred to a sorting device for sorting to size (or weight, quality and the like). The fruits are carried using a water flow to a discharge conveyor for discharging the fruits from the liquid container, wherein the discharge conveyor is for instance an endless conveyor with diabolo-shaped receiving elements for the fruits.

An example of a known device is described in the European patent application EP-A-0 635 443, wherein the fruits are transferred from a water channel to a discharge conveyor using tubes. The capacity and utilization of this tubular transfer device is insufficient, while there is a considerable risk of damage to the vulnerable fruits.

From the U.S. Pat. No. 2,831,518 is known a device wherein tomatoes are skinned and wherein a conveyor extends below a liquid surface in a liquid holder.

A conveyor of V-shaped cross-section for reorienting a fruit or a vegetable along a determined axis is further known from the U.S. Pat. No. 5,121,635, wherein there is however no liquid holder.

SUMMARY OF THE INVENTION

The present invention has for its object to improve the known device and provides a device for singulating from a holder with liquid and/or individualizing of products, such as fruits, wherein the device comprises:

a discharge conveyor extending above the liquid level in the holder for discharging the products in rows; and a feed conveyor of V-shaped cross-section, the discharge end of which connects onto a front end of the discharge conveyor and which extends at an inclination from this front end to below the liquid level in the liquid holder.

Because the V-shaped feed conveyor extends partially under water, the fruits are urged by the water flow into the tracks until the V-shaped conveyor, which can be driven at relatively high speed, engages on the fruits and transports them, preferably up against a rotatable brush roller placed above the transition between the feed conveyor of V-shaped cross-section and the discharge conveyor.

Since it has been found in experiments that the conveyor of V-shaped cross-section must be precisely positioned relative to the liquid level, both ends of the feed conveyor are preferably height-adjustable, as is the front end of the discharge conveyor connecting onto the feed conveyor.

The liquid level is determined inter alia by the force of circulation means for the liquid, such as a pump. For a more accurate adjustment of the liquid flow to the setting of the feed conveyor, a pivotal plate is preferably situated at some distance from this liquid level, which plate influences the volume of the liquid flow to a greater or lesser degree and thus the speed at which the fruit is supplied. The liquid level is determined inter alia by the force of the circulation means, the number of fruits in the channel and the degree of wave action in the liquid bath.

In order to prevent the possibility of fruits flowing to the V-shaped conveyor becoming snagged, the conveyor belts of the V-shaped conveyor preferably have a different speed so that the fruits are rotated slightly and are carried successively into a track.

BRIEF DESCRIPTION OF THE DRAWINGS

Further advantages, features and details of the present invention will be elucidated on the basis of the following description of a preferred embodiment thereof with reference to the annexed drawings, in which:

FIG. 2 shows a front view of the device shown in FIG. 1;

FIG. 3 shows the top view of a further preferred embodiment of a device according to the present invention; and FIG. 4 is a side view of the preferred embodiment shown in FIG. 3.

DETAILED DESCRIPTION

Figure 1:
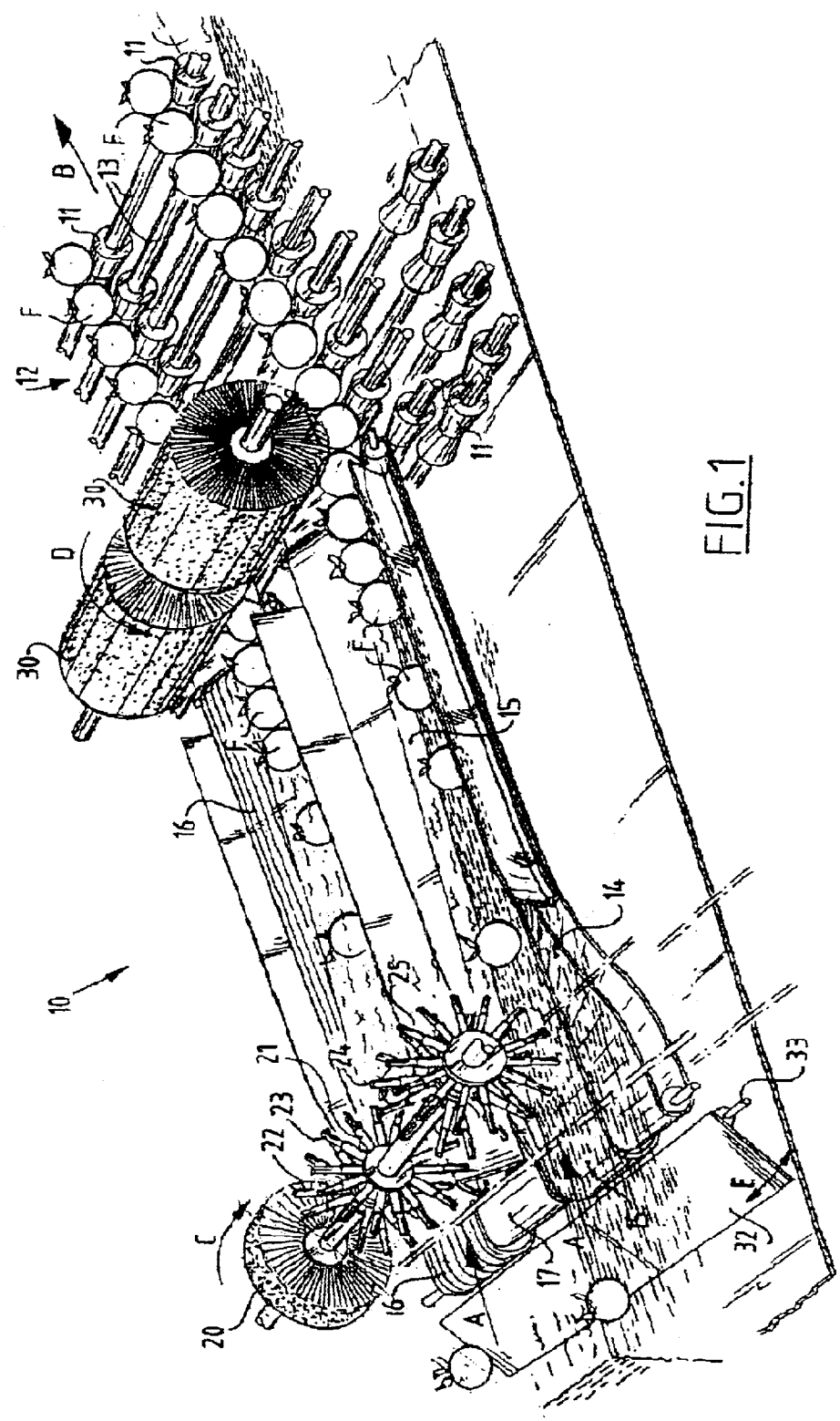
FIG. 1 shows a view in perspective a (part of a) first preferred embodiment of a device according to the present invention.

In a preferred embodiment 10 of a device according to the present invention fruits F are supplied by a water flow, the direction of which is designated with arrow A. In the present embodiment two tracks for the fruits F are shown, while it is noted that it will be apparent that a larger number of tracks is possible in another embodiment.

In the present embodiment the fruits F are discharged in the direction of arrow B on a discharge conveyor 12 provided with diabolo-shaped elements 11. The diabolo-shaped elements arranged on rods 13 form an endless conveyor which is driven in a manner not further shown close to one or both reversing wheels.

From the front end of discharge conveyor 12 a number of conveyor belts 14, 15, 16 and 17 extend slightly downward to below the level of the liquid on which fruits F float and are supplied in the direction of arrow A. Conveyor belts 14 and 15 together form a conveyor of V-shaped cross-section, as do the obliquely disposed conveyor belts 16 and 17, whereby two feed tracks are formed.

Since at least a part of conveyor belts 14–17 is situated under water, the conveyor belts and drives therefore must be embodied in moisture-proof material such as rubber and stainless steel.

It has been found from tests that transporting of the fruits from the liquid holder with the conveyor of V-shaped cross-section works so well that this feed conveyor can extend outside the liquid holder, whereby a discharge conveyor also extending partially under water, in any case in the return part, can be omitted. The fruits are thus carried directly out of the holder onto a singulating device above which a brush roller is arranged in order to ensure a good transfer of the possibly vulnerable fruits.

Preferably arranged on either side of each pair of obliquely disposed conveyor belts 14, 15 respectively 16, 17 are wheels 20, 21, 22, 23, 24 and 25 which are provided with fingers and rotatable in the direction of arrow C, which wheels dose the fruits into the tracks at the desired rate.

In the shown preferred embodiment of the device according to the present invention the fruits are carried along by the liquid flow produced using a pump (not shown). The fruits are dosed by finger wheels 20–25 into the space of substantially V-shaped cross-section which is bounded in each case by the two endless conveyor belts 14, 15 respectively 16, 17, wherein the fruits are engaged by the conveyor belts, for instance halfway along depending on the size thereof, and are transported up against a rotatable stop such as a brush roller 30 which is rotatable in the direction of arrow D and placed above the transition between endless conveyor belts 14–17 and discharge conveyor 12. In the device shown in FIG. 1 the left and right-hand conveyor belt of the conveyor of V-shaped cross-section have a different speed in that rollers thereof have a different diameter. The fruits are hereby rotated and singulated in the tracks. In addition, the inclination of the conveyor of V-shaped cross-section changes from (practically) planar to V-shaped so as to engage the fruits in suitable manner and to cause the fruits to flow as well as possible. The fruits are transported by the obliquely disposed conveyor belts 14–17 at desired speed as far as brush roller 13. The rotating brush acts to bring the fruits to the speed suitable for the discharge conveyor.

Since in a practical embodiment the liquid flow produced by a circulation pump will have a force such that the liquid level will not be exactly horizontal because it rises on one side, it is important for correct operation of the device that conveyor belts 14–17 are precisely adjustable relative to this liquid level; for this purpose both the front and rear ends are preferably height-adjustable, while for correct connection onto the rear end the front end of discharge conveyor 12 preferably also takes a height-adjustable form.

For precise adjustment of the desired liquid flow, which can likewise take place by means of adjusting the force of the circulation means, a plate 32 is preferably arranged at some distance below the liquid level, which plate extends transversely over a considerable part of the width of the liquid holder (not shown) or the liquid channel and which is adjustable round a shaft 33 in the direction of double arrow E to a position holding back the return flow to a greater or lesser extent, so that the force of the liquid flow as well as the height of the liquid level at the location of the obliquely disposed conveyor belts 14–17 can thus be adjusted more precisely. The quantity of water above and below the conveyor of V-shaped cross-section is adjusted by rotating plate 32.

In the preferred embodiment shown in FIGS. 3 and 4 the fruits F are urged from a water channel 41 to a conveyor 42 of substantially V-shaped cross-section which extends from below the liquid level to above this level and transports the fruits substantially horizontally from about halfway along liquid holder 43 to a singulating device 44 to which the fruits are transferred and wherein the fruits are received by a brush roller 45 arranged above the transition. The thus singulated fruits are subsequently sorted in the usual manner to weight, quality, colour and the like. The embodiment according to FIGS. 3 and 4 has of course the advantage that the elevator or discharge conveyor of FIGS. 1 and 2, of which in any case the return part extends under water, can be omitted.

The present invention is not limited to the above described preferred embodiment; the rights sought are defined by the following claims, within the scope of which many modifications can be envisaged.

What is claimed is:

1. A device adapted for separating products from a plurality of products placed within a holder with a liquid in which the products are held, said device comprising
   a discharge conveyor extending above the liquid level of the holder and adapted for discharging the products in rows therefrom; and
   a feed conveyor having at least partially V-shaped arms extending transvexels therefrom and having a discharge end which connects onto a front end of the discharge conveyor, the feed conveyor extending at a declination from the front end of the discharge conveyor to below the liquid level in the liquid holder and the V-shaped arms thereof receiving the products therebetween for moving the products in a coherent fashion toward the discharge conveyor.

2. The device of claim 1, further comprising a stop placed above the transition between the feed conveyor and the discharge conveyor.

3. The device of claim 1, wherein the feed conveyor is formed by conveyor belts or ropes placed obliquely relative to each other.

4. The device of claim 3, wherein the conveyor belts have an adjustable differing or equal speed relative to each other.

5. The device of claim 4, wherein the conveyor belts have drive rollers of differing diameters.

6. The device of claim 1, wherein the inclining position of the feed conveyor is adjustable relative to the liquid level within the holder.

7. The device of claim 1, wherein rotatable fingers or brushes are placed on either side of the feed conveyor to dose the products to the desired extent to the associated feed conveyor.

8. The device of claim 1, wherein the position of the discharge conveyor is adjustable relative to the liquid level within the holder.

9. The device of claim 1, wherein the feed conveyor extends beyond the liquid holder and the discharge conveyor connects onto the feed conveyor outside of the liquid holder.

10. The device of claim 2, wherein the stop comprises a brush roller.

11. A method of separating products from a holder with a liquid in which a plurality of products is held, said method comprising:
   positioning a feed conveyor at an inclined angle with respect to the liquid level in the holder so that a first end of the feed conveyor is received within the holder and below the liquid level therein and a discharge end of the feed conveyor is positioned above the liquid level;
   moving the products with a pair of V-shaped arms adapted to engage the products and move them toward the discharge end of the feed conveyor; and
   passing the products from the discharge end of the feed conveyor onto a discharge conveyor spaced above the liquid level of the holder.

12. A device adapted to separate products from a holder with a liquid in which the plurality of products is held, said device comprising:
   an elongate feed conveyor positioned at an angle with respect to the liquid level in the holder, a first end of the feed conveyor being received within the holder and below the liquid level therein and a discharge end of the feed conveyor being positioned above the liquid level, the feed conveyor having a pair of V-shaped arms sized and shaped to engage the products and for carrying the products therein toward the discharge end thereof; and
   a discharge conveyor spaced above the liquid level of the holder for conveying the products passed from the feed conveyor, the discharge conveyor having a first end positioned with respect to the discharge end of the feed conveyor for receiving the products thereon.

* * * * *